United States Patent [19]

Aprahamian et al.

[11] Patent Number: 4,794,605
[45] Date of Patent: Dec. 27, 1988

[54] METHOD AND APPARATUS FOR CONTROL OF PHASE CONJUGATION CELLS

[75] Inventors: Robert Aprahamian, Hermosa Beach, Calif.; Theodore C. Salvi, Albuquerque, N. Mex.

[73] Assignee: TRW Inc., Redondo Beach, Calif.

[21] Appl. No.: 839,764

[22] Filed: Mar. 13, 1986

[51] Int. Cl.$^4$ .......................... H01S 3/10; H01S 3/098; H01S 3/082; G11C 29/00

[52] U.S. Cl. ........................................... 372/9; 372/18; 372/20; 372/21; 372/22; 372/31; 372/32; 372/97; 372/99

[58] Field of Search ................... 372/3, 9, 18, 21, 22, 372/20, 31, 32, 29, 97, 99; 356/354

[56] References Cited

U.S. PATENT DOCUMENTS

| | | | |
|---|---|---|---|
| 3,564,450 | 10/1967 | Immarco et al. | 372/22 |
| 4,344,042 | 8/1982 | Hon | 372/33 |
| 4,529,273 | 7/1985 | Cronin-Golomb et al. | 372/99 |
| 4,573,157 | 2/1986 | O'Meara | 372/102 |
| 4,637,027 | 1/1987 | Shirasaki et al. | 372/9 |
| 4,648,092 | 3/1987 | Ewbank et al. | 372/21 |

OTHER PUBLICATIONS

Giuliano "Applications of Optical Phase Conjugation", Physics Today, Apr. 1981, pp. 27-35.

Primary Examiner—Eugene R. Laroche
Assistant Examiner—Michael Shingleton
Attorney, Agent, or Firm—Noel F. Heal; Sol L. Goldstein

[57] ABSTRACT

A technique in which one or more phase conjugation cells, such as stimulated Brillouin scattering cells, are controlled by use of a seed beam injected into the cells. When a laser beam is focused into a phase conjugation cell, a reflected phase conjugated beam is produced. The seed beam is injected at the same frequency and in the same direction as the expected phase conjugated beam, and is adjusted to control the phase and other characteristics of the phase conjugated beam. In multiple cell arrays, seed beams are employed to ensure phase coherency of multiple beams. For lower energy applications, use of the seed beam allows a phase conjugation cell to be operated with incident beams of lower energy than would be needed without the seed beam.

11 Claims, 4 Drawing Sheets

METHOD AND APPARATUS FOR CONTROL OF PHASE CONJUGATION CELLS

CROSS-REFERENCE TO RELATED APPLICATION

This application is related to application Ser. No. 06/832,950 filed on Feb. 26, 1986, entitled "Phased Array Combination of Laser Beams."

BACKGROUND OF THE INVENTION

This invention relates generally to relatively high-power lasers and, more particularly, to phased arrays of multiple lasers. There are two basic areas of application for the present invention. One area involves the need for a high-energy laser source using multiple lasers in a phased array, for use as defensive weapons or in communications systems. The other area arises from the need for a lower energy laser source that is free of phase aberrations and has a stable intensity profile, for use in industrial applications such as laser welding or cutting. The background relating to these basic areas will now be discussed in more detail, beginning with the need for a ground-based or spaced-based high-energy laser source of large effective aperture and power.

The physics of monolithic high-energy lasers, such as excimer lasers, impose inherent limitations that preclude their operation at apertures greater than some level limited by considerations such as pump dimensions, the presence of parasitics, optical element sizes, media uniformity, and so forth. For excimer lasers, energy levels greater than a fraction of one megajoule (MJ) in a pulsed mode of operation are difficult to achieve.

For lasers to be effectively used as defensive weapons, much higher energy levels are needed, and recent design efforts in this field have, therefore, focused on systems that employ arrays of lasers producing a single composite beam of very high energy. If an array of N beams, each of the same energy level, is appropriately focused onto a target, the energy intensity at the target will be in the order of N times the intensity resulting from just one of the beams. This assumes that the energy of the beams adds incoherently, i.e. that the separate beams are not in phase with each other. However, if the beams can be combined coherently, i.e. practically perfectly matched in frequency and phase, the energy intensity at the target will be approximately $N^2$ times the intensity of a single beam. For an array of one hundred lasers, for example, there is a potential for increasing the target intensity by a factor of one hundred if the separate beams can be combined coherently rather than incoherently.

The concept of combining separate radiation beams coherently in phased arrays is well known in radio communications, but has been more difficult to put into practice for optical radiation. The difficulty, of course, stems from the difference in wavelengths between radio and optical waves. Even for radio transmissions at 1 GHz (gigahertz) and above, the wavelengths are measured in terms of centimeters or millimeters, and the construction of a phased array having mechanical tolerances of one twentieth of a wavelength are attainable without great difficulty. For optical radiation, however, the tolerances are very stringent. Light of wavelength 248 nm (nanometers), for example, requires tolerances of around $1.2 \times 10^{-6}$ cm to achieve phase coherence to within one twentieth of a wavelength. Separate laser beams emanating from separate laser amplifiers are subject to separate sets of phase-aberrating conditions in the amplifiers and in the associated optical elements for each beam path. The resulting differences in phase arise not only from differences in construction and geometrical relationships, but also from factors that may vary with time. For example, optical components may be subject to mechanical "jitter" that causes phase and pointing changes, and the laser gain region within each amplifier may also change significantly with time.

Early approaches to optical phased-array technology have utilized principles of adaptive optics to achieve some degree of phase coherence. Basically, this involves the use of one or more deformable mirrors, which are large reflecting surfaces made up of separately movable elements, each driven by a transducer, such as a piezoelectric device. The character of the optical wavefront emanating from such a mirror has to be sensed with a complex and highly sensitive interferometer, and then the composite wavefront has to be converted to electrical form, stored in an electronic memory, and manipulated mathematically to determine the magnitude of elemental corrections that have to be made in the deformable mirror.

The adaptive optics approach is inherently slow, because of its reliance on mechanical elements to effect phase compensation. The approach is also subject to errors due to intermirror optical path length differences, called "piston errors." Compensation of these errors has required the use of very complex arrangements of interferometry and adaptive optical components. The approach becomes even less practical as the size of the desired beam aperture increases. For large apertures, in the order of ten meters in diameter, deformable mirrors having as many as 10,000 elements may be required. Since each element is of finite size, the array has limited resolution and ability to correct wavefront distortions. Moreover, the cost and reliability of deformable mirrors of this magnitude have posed serious limitations to the development of a practical phased array system using adaptive optics.

By way of further background, the invention also relates to the field of phase conjugate optics. It has been recognized for some time that phase conjugation of light waves can be used to remove phase aberrations caused by the passage of a light beam through a distorting or phase-aberrating medium.

There is extensive literature on the subject of phase conjugate optics and the use of phase conjunction for the compensation of phase aberrations. A summary of the history and principles of phase conjugate optics is provided in a paper entitled "Phase Conjugate Optics and Real-Time Holography," by Amnon Yariv, IEEE Journal of Quantum Electronics, Vol. QE-14, No. 9, September, 1978, pp. 650–60.

Simply stated, a phase conjugation cell functions as a reflector with a special and useful property. When an incident light wave is focused into the cell, the reflected wave that emerges is the complex conjugate of the incident wave. The practical consequence of the phase conjugation is that the retro-reflected wave is as if it were "time-reversed" with respect to the incident wave. For example, if an incident wave, after passing through a distorting medium, has a bulge in its wavefront, representing a phase-lagging condition at a particular region of the front, this will be reflected as an opposite bulge, i.e. a phase lead, in the same region of the reflected wavefront. If the reflected wavefront then traverses the same distorting medium that caused the original bulge in the incident wavefront, the reflected wave will emerge from the distorting medium as an undistorted wave.

In spite of the existence of a large body of theoretical knowledge concerning the principles of phase conjugate optics, prior to the present invention these principles have not been applied to the problem with which the invention is concerned. It will be appreciated from the foregoing that there is still a critical need for an alternative approach to the construction of phased arrays of high-energy lasers. What is needed is a technique for coupling the outputs of multiple laser amplifiers together in frequency and phase, while at the same time eliminating "piston errors" between adjacent beams, and compensating for other sources of phase aberration in each beam path, at high resolution.

The cross-referenced application proposes a solution to the problems described above. The present invention represents an alternative and, in some respects, a more desirable solution to the same problem. In addition, the present invention also fulfills a need for laser sources of lower energy, for use in a wide range of industrial applications.

SUMMARY OF THE INVENTION

The present invention resides in a practical application of the principles of phase conjugation to the production of coherent laser beams in which phase aberrations are virtually eliminated by means of a technique wherein a phase conjugation cell is "back-seeded" with a laser beam that provides phase control of a conjugated beam emanating from the cell. Briefly, and in general terms, the apparatus of the invention includes a laser beam source for producing a coherent laser beam, a phase conjugation cell, and first optical means, for focusing the laser beam into the phase conjugation cell, to produce a phase conjugated laser beam from the cell. The invention also includes a seed laser beam source, and second optical means, for focusing the seed laser beam into the phase conjugation cell in substantially the same direction as the phase conjugated laser beam.

The seed laser beam functions in such a manner as to control the properties of the conjugated laser beam emanating from the phase conjugation cell. In particular, the seed laser beam can be used to control or stabilize the intensity profile of the phase conjugated laser beam, and it can be used to reduce the power of the source laser beam that would otherwise be needed to produce phase conjugation in the cell.

Perhaps even more important is the application of the principle of the invention to arrays of multiple lasers using multiple phase conjugation cells. In such an arrangement, the second optical means is capable of focusing the seed laser beam into multiple phase conjugation cells. The second optical means also includes means for controlling the relative phase of the seed laser beam, in order to produce multiple phase conjugated laser beams that are phase coherent with each other.

Without the use of the invention, multiple phase conjugated beams from multiple phase conjugation cells would be subject to random time-dependent changes, and there would be no way to achieve perfect phase coherence of the multiple beams.

It will be appreciated from the foregoing that the present invention represents a significant advance in the field of laser beam optical systems. Specifically, the invention employs a seed laser beam injected into the rear of a phase conjugation cell to control the intensity, phase and frequency properties of a phase conjugated laser beam derived from an incident laser beam.

In summary, there are two principal advantages to the use of a seed laser beam in conjunction with a phase conjugation cell. One is that the phase conjugation properties of the cell may be employed at a much lower input power than is needed if the seed beam is not present. Therefore, the phase conjugation principle can be used for lower-energy industrial applications requiring the production of a laser beam that is free of phase aberrations. The second advantage of the use of back-seeding in phase conjugation cells is that multiple cells may be used in conjunction with multiple laser beams, to produce an array of laser beams of which the phase is completely controlled as desired, allowing the production of a higher energy density than could be obtained from multiple beams that were not phase coherent with each other, or from multiple beams focused into a single phase conjugation cell.

Other aspects and advantages of the invention will become apparent from the following more detailed description, taken in conjunction with the accompanying drawings.

DESCRIPTION OF THE PREFERRED EMBODIMENT

Figure 1:
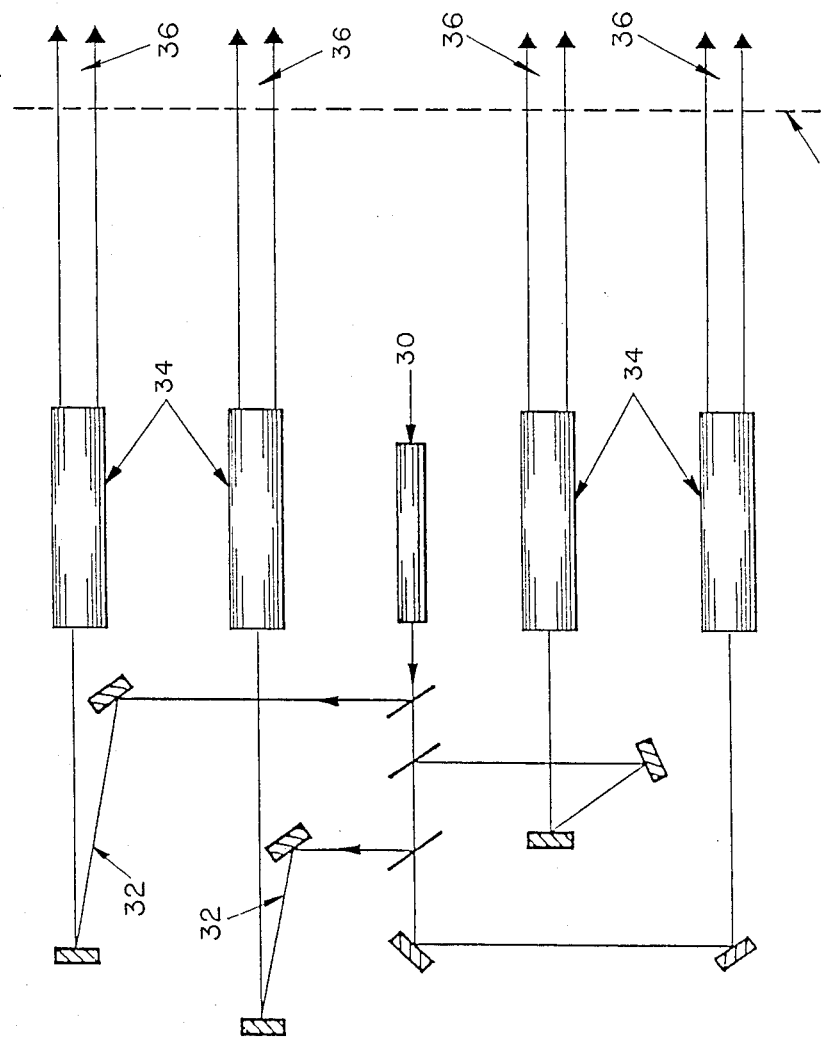
FIG. 1 is a schematic view of a phased array laser system employing a master oscillator power amplifier (MOPA) configuration.

As shown in the drawings for purposes of illustration, the present invention is concerned with lasers used in conjunction with phase conjugation cells. The cross-referenced application discloses and claims a technique for coupling multiple high-energy laser beams in a phase coherent relationship by focusing each of the beams into a single phase conjugation cell. Prior to the present invention, the use of phase conjugation cells to achieve phase coherency and for other related purposes, has suffered from two significant drawbacks. First, in applications involving arrays of laser beams, the use of a single phase conjugation cell has an inherent upper power limit. If multiple cells are used to increase the total power, then phase coherency between the beams is lost. Second, there is a power threshold for each phase conjugation cell, below which the phase conjugation principle does not operate. Consequently, it has not been impossible to employ phase conjugation principles to remove optical aberrations or control phase coherency in applications requiring lower energy levels.

The present invention solves both of the foregoing problems by providing a seed beam for injection into the back of each phase conjugation cell. This has two principal effects. First, the seed beam controls the phase and the intensity profile of the phase conjugated beam. Therefore, when multiple cells are used the seed beams can be controlled to produce phase conjugated beams that are perfectly phase coherent. Second, the use of a seed beam allows the phase conjugation cell to operate at a power level below its operating threshold when no seed beam is used. Therefore, the seeded phase conjugation cell can be used at lower energy levels and in a wide range of industrial and other applications.

Figure 3A:
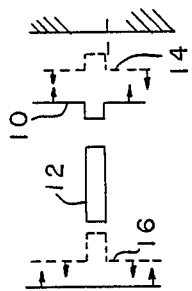
FIGS. 3a and 3b are schematic views illustrating the principle of phase aberration cancellation by optical phase conjugation.
Figure 3B:
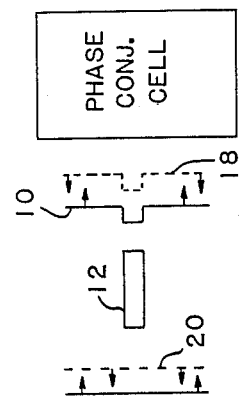

To understand how the invention achieves these goals, it is desirable to have a basic understanding of the principle of optical phase conjugation. The illustrative example given in FIGS. 3a and 3b is provided for this purpose.

Although there is a rigorous mathematical explanation of phase conjugation, an intuitive understanding of the principle can be obtained without using a mathematical description of the light waves involved. A perfect planar or spherical wavefront can be distorted by many different factors, such as imperfect optical elements, or a distorting propagation medium. Any source of phase distortion can produce a wavefront that is no longer perfectly planar or spherical. For example, the wavefront indicated by reference numeral 10 in FIG. 3a has been distorted by a distorting medium 12, such that one region of the wavefront lags in phase behind the remainder of the wavefront. If this distorted wavefront were to be reflected from a conventional mirror, as shown in FIG. 3a, the reflected wavefront would still exhibit a phase-lagging bulge in one region. Since the reflected wavefront is traveling in the opposite direction to the incident wavefront, the "bulge" of the distortion appears on the opposite side of the wavefront, as indicated at 14. As the reflected wavefront traverses the distorting medium, the lagging bulge in the wavefront is distorted even further, as indicated at 16.

One important consequence of phase conjugation is that it results in reflection in a "time reversal" manner. What is meant by this is that a phase-lagging portion of the incident wavefront will reflect as a phase-leading portion of the reflected wavefront. The reflected wavefront then appears as an exact duplicate of the incident wavefront, but it is traveling in the opposite direction, as indicated at 18. After passing through the distorting medium again, the reflected wave 20 is exactly phase-corrected. In effect, the first pass through the distorting medium probes or measures the medium for phase-aberrating conditions, and these are recorded on the wavefront of the incident light beam. As a result of the action of the phase conjugation cell, the recorded aberrations are changed in such a manner as to automatically compensate for them on the return pass through the distorting medium.

Phase conjugation can be accomplished using any of a number of alternative techniques, among them being stimulated Brillouin scattering (SBS) and four-wave wave mixing (FWM). These are explained in more detail in the Yariv paper cited in the background section of this specification. The particular technique employed for phase conjugation is not critical to the invention, as will become apparent as the description proceeds.

As shown in FIG. 1, the configuration usually employed in phased arrays of lasers is the so-called master oscillator power amplifier (MOPA) configuration. A master laser 30 oscillator is employed to generate a reference beam, which is divided into sub-beams in beam-splitting and optical delay lines, indicated generally at 32. The sub-beams are injected into separate multi-pass laser power amplifiers 34, the output beams from which are combined, as indicated at 36. To achieve phase coherency between the output beams has proved to be extremely difficult. Adjusting the path lengths of the sub-beams for phase coherency is a complex matter, even if wavefront sensors and deformable mirrors are used.

Figure 2:
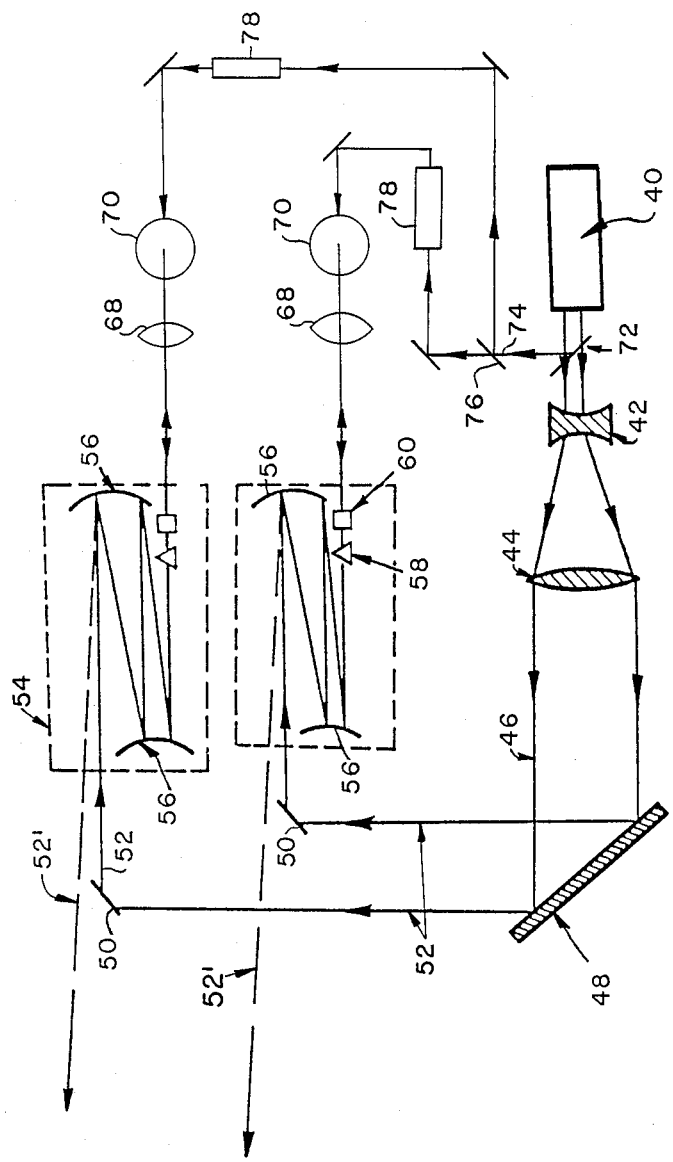
FIG. 2 is a schematic view of a system employing multiple laser amplifiers and multiple phase conjugation cells in accordance with the principles of the present invention.

The principle of the master oscillator power amplifier configuration is still employed in one embodiment of the present invention, as shown in FIG. 2, but with the important difference that phase conjugation is used to achieve phase coherency between the sub-beams. A master oscillator 40 generates a coherent reference beam that is diffraction limited and of relatively low power. The reference beam passes through a negative lens 42 and a collimating lens 44, to produce an enlarged reference beam, as indicated at 46. The enlarged reference beam 46 is then reflected from a plane mirror 48, after which it impinges on multiple input mirrors 50, only two of which are shown in FIG. 2. The input mirrors produce separate beams, which are referred to as the probe beams, and which follow optical paths 52 into separate laser power amplifiers 54, only two of which are shown.

Each laser power amplifier 54 has a pair of opposed curved mirrors 56 and includes a laser gain region (not shown) between the mirrors. Each entering beam 52 makes multiple passes through the gain region, the number of passes depending on the geometry of the curved mirrors 56, and being selected to provide practically complete saturation flux in the finally emerging beams. After the final pass through its amplifier 54, each probe beam passes through a birefringent wedge 58, which is sensitive to the direction of linear polarization of the beam passing through it. Specifically, the wedge 58 deflects the beam through a small angle, the magnitude of which depends on the polarization. After passing through the wedge 58, the probe beam passes through a quarter-wave plate 60, which has the effect of converting the polarization of the beam from linear to circular.

Each probe beam is then focused by a separate positive lens 68 into separate phase conjugation cells 70, which, in the presently preferred embodiment of the invention, are stimulated-Brillouin-scattering (SBS) cells. The effect of each cell 70 is to produce for each incident beam a reflected beam that is the phase conjugate of the incident beam. As previously suggested, the phase conjugated beam may be thought of as "time reversed." As explained with reference to FIGS. 3a and 3b, the reflected wave will have its phase distortions removed on the return pass from the phase conjugation cell 70.

The reflected beams retrace the paths of the respective probe beams, but with one important exception. On encountering the quarter-wave plate 60, the circularly polarized reflected beam will be converted to linear polarization of the opposite type to that of the probe beam before it first encountered the quarter-wave plate. In other words, the two passes through the quarter-wave plate 60 result in the direction of linear polarization being rotated by ninety degrees. As a result, the reflected beam is deflected through a slightly different angle by the birefringent wedge 58, and the reflected beam eventually emerges from the amplifier 54 along a path 52' that diverges from the input path 52, and completely misses the input mirror 50. In this manner, the reflected beams are distinguished from the probe beams and may be collected together for output as a single coherent beam.

The reflected beams, being phase conjugates of the probe beams, and following practically the same path through the amplifiers 54, emerge along the paths 52' almost completely free of aberrations caused by variations among the amplifiers and their associated optical components. The aberrations may result from imperfections in any of the optical elements, lack of homogeneity in the amplifiers, lack of alignment, beam jitter, or inter-mirror "piston errors." Regardless of the source of the aberration, the phase conjugation technique not only compensates for it but, ideally, ensures that all of the reflected beams are phase coherent with each other.

The only errors not compensated for by phase conjugation are those arising from imperfections in the reference beam components, specifically, the lenses 42 and 44, and the mirrors 48 and 50. This is because the input mirrors 50, and all optical components encountered by the reference beam prior to the input mirrors, are not included in the paths of the beams reflected from the phase conjugation cell 70, and are therefore not subject to phase error correction by the conjugation process. Two approaches are possible for minimizing the effect of these remaining possible errors. First, the components can be made and aligned as precisely as possible. Second, one of the components, such as the mirror 48 can be fabricated as a deformable mirror. This does not render the invention subject to the disadvantages of adaptive optic systems, however. Unlike the aberrations introduced in the amplifiers 54, aberrations introduced by the reference beam optical components are constant in nature, and can be compensated by a single setting of a deformable mirror. Stated another way, the aberrations introduced in the reference beam components do not, in general, require continuous or "real-time" compensation. The errors can be measured, then compensated for in the deformable mirror.

The principal difficulty with the system as described thus far is that the separate phase conjugation cells 70 introduce random time dependence into the conjugated reflected beams. The SBS process can be described as the scattering of light from an acoustic disturbance in fluid contained in the cell. The scattering occurs when a beam of high enough energy is focused into the fluid. The scattered beam is slightly Doppler shifted in frequency by an amount depending on the speed of sound in the fluid. Different cells activated by different beams will, in general, introduce different time dependencies, resulting in reflected beams that are proper phase conjugates but are not phase coherent with each other as desired.

As shown in FIG. 2 the apparatus of the invention also includes a beam splitter 72 positioned in the path of the laser beam from the oscillator 40, to produce a secondary beam 74. This beam 74 is further divided into two portions, by another beam splitter 76, and each of the resulting portions is passed through a frequency-shifting device 78 and is reflected by an arrangement of mirrors into the back of the cells 70 as "seed" beams. Each seed beam is frequency shifted by the same amount as the SBS cell is expected to Doppler shift the incident beam. Therefore, the seed beam has the same frequency and direction as the expected phase-conjugated beam reflected from the cell. However, the seed beam has the effect of controlling the frequency, phase, and intensity profile of the phase conjugated beam. In the context of multiple cells and beams, the seed beam principle can be usefully employed to produce multiple conjugate beams that are phase coherent with each other. To achieve this end also requires adjustment of the relative path lengths of the seed beams, to ensure that the seed beams on entering the respective SBS cells all have the same frequency and phase.

Figure 4:
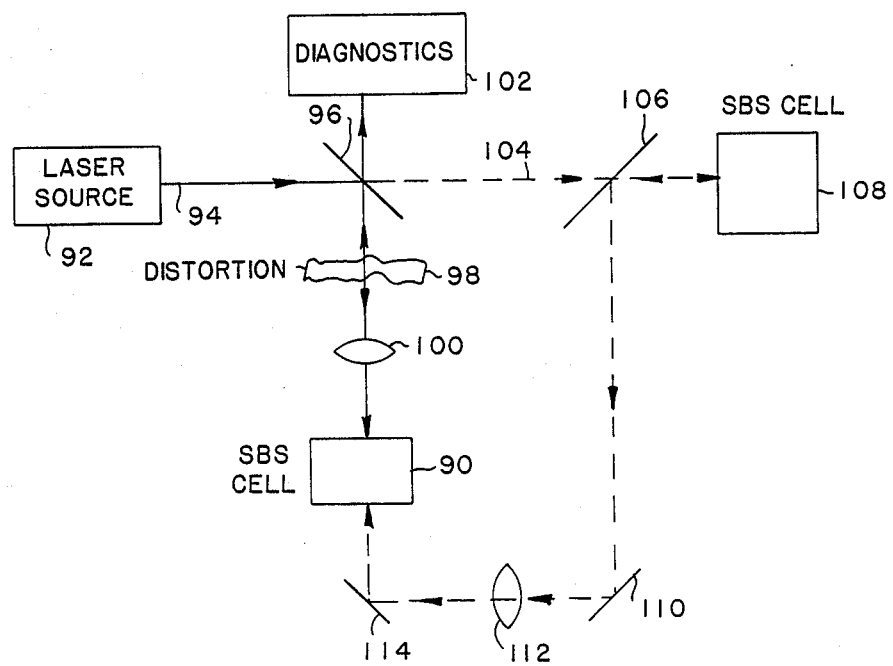
FIG. 4 is a schematic view of a laboratory apparatus for demonstrating the principle of backseeding of a phase conjugation cell.

FIG. 4 shows a laboratory apparatus for demonstrating the principle of back-seeding a single SBS phase conjugation cell, indicated at 90. A laser source 92 produces a beam 94 that impinges on a beam splitter 96. The beam reflected from the beam splitter 96 is passed through a phase distorting medium, indicated at 98, and then through a lens 100, to be focused into the SBS cell 90. A phase conjugated beam is reflected from the cell 90, passes back through the beam splitter 96, and is processed by apparatus 102 referred to as "diagnostics." The diagnostics may include an interferometer, a power meter, and an intensity profile camera, none of which is shown. The beam splitter 96 passes a transmitted beam 104 through to another beam splitter 106. Part of the beam 104 passes through the beam splitter 106 and into a second SBS cell 108, which acts as a frequency shifter for a seed beam. The reflected and frequency shifted beam from this cell 108 is, in part, reflected by the beam splitter 106, reflected by a plane mirror 110, focused by a second lens 112, and finally reflected by another plane mirror 114 into the back of the first SBS cell 90. The characteristics of the seed beam can be analyzed in the diagnostics 102, since a portion of the seed beam from the second SBS cell 108 will reach the diagnostics through the second beam splitter 106 and by reflection from the first beam splitter 96. For comparison of the phase conjugated beam with the original phase-distorted beam from the laser source, the second beam splitter 106 can be replaced with another plane mirror (not shown), to reflect the phase-distorted beam directly back and into the diagnostics 102.

With the apparatus of FIG. 4, it can be demonstrated that the phase conjugated beam from the main SBS cell 90 is phase-locked with the seed beam. It can also be demonstrated that the back-seeded SBS cell 90 operates as a phase conjugation cell at power levels well below the threshold power required when the cell is not back-seeded. Accordingly, the cell can be employed to provide a lower-energy laser beam that is free of phase aberrations. Another advantage of back-seeding the cell is that the intensity profile of the phase conjugated beam is improved or stabilized. Without back-seeding, the phase conjugated beam emanating from an SBS cell is usually of non-uniform intensity profile, even though good phase conjugation is achieved. In the case of the backseeded cell, the intensity profile is improved.

Although the physical basis for the improvements discussed above is not entirely understood, it is at least clear that the back seed beam functions very much as pattern or control for the production of the phase conjugated beam. The characteristics of the seed beam, which, because of its lower power, can be accurately controlled, determine the corresponding characteristics of the higher powered phase conjugated beam.

It will be appreciated from the foregoing the present invention represents a significant advance in the field of laser optics. In particular, the invention provides a novel technique for controlling the phase of single or multiple phase conjugated light beams. Application of the invention to arrays of laser beams allows the production of a phase coherent array of extremely high energy, and allows the output beams of an array of lasers to be combined in any desired interference pattern. Furthermore, the use of a back seed beam permits single or multiple phase conjugation cells to by operated at lower energy levels than if no seed beam were used.

It will also be appreciated that, although embodiments of the invention have been described in detail for purposes of illustration, various modifications may be made without departing from the spirit and scope of the invention. Accordingly, the invention is not to be limited except as by the appended claims.

We claim:

1. Apparatus for producing an array of laser beams having a predetermined phase relationship, the apparatus comprising:
   a laser beam source for producing a plurality of laser beams;
   an equal plurality of stimulated-Brillouin-scattering (SBS) phase conjugation cells;
   first optical means, for focusing the laser beams into the respective phase conjugation cells, to produce an equal plurality of phase conjugated laser beams from the cells;
   a seed laser beam source;
   second optical means, for focusing the seed laser beam into each of the phase conjugation cells in substantially the same direction as the phase conjugated laser beams; and
   means for controlling the phase of the seed beams to obtain the desired phase relationship between the phase conjugated beams, the means for controlling phase being adjusted to achieve phase coherency among the phase conjugated beams;
   and wherein
      the laser beam source includes a master laser oscillator for producing a reference laser beam that is coherent and diffraction-limited, means for dividing the reference beam into a plurality of probe beams, and an equal plurality of laser amplifiers positioned to receive the respective probe beams, each including a laser gain region and optical means to provide multiple passes through the gain region, to produce near saturation flux in the probe beams;
      each phase conjugated beam is reflected from its phase conjugation cell along a path substantially identical with that of the corresponding probe beam; and
      the apparatus further includes discrimination means associated with each of the probe beams, for discriminating between a probe beam and the corresponding reflected beam, whereby the reflected beams emerging from the laser amplifiers are phase coherent with each other and are free of aberrations resulting from passage through the laser amplifiers and associated components.

2. Apparatus as defined in claim 1, wherein the discrimination means includes:
   polarization-sensitive means, for deflecting the probe beam and the reflected beam through an angle dependent on the direction of polarization; and
   means for polarizing the probe beams and the reflected beams in different directions;
   whereby the reflected beams emerge from the laser amplifiers along very slightly different paths from those along which the probe beams entered the amplifiers, and the reflected beams can therefore be deflected out of the apparatus as part of a composite output beam.

3. Apparatus as defined in claim 2, wherein:
   the polarization-sensitive means includes a birefringent wedge; and
   the means for polarizing the beams differently includes a quarter-wave plate, which changes the direction of linear polarization by ninety degrees as a result of two passes through the plate.

4. A method for producing an array of laser beams having a predetermined phase relationship, the method comprising the steps of:
   generating a plurality of laser beams;
   focusing the laser beams into respective ones of an equal plurality of stimulated-Brillouin-scattering (SBS) phase conjugation cells;
   producing an equal plurality of phase conjugated laser beams from the cells;
   generating a seed laser beam;
   focusing the seed laser beam into each of the phase conjugation cells in substantially the same direction as the phase conjugated laser beams; and
   controlling the phase of the seed laser beams to obtain the desired phase relationship between the phase conjugated beams, including adjusting the phase of the seed laser beam to achieve phase coherency among the phase conjugated beams;
   wherein
      the step of generating a plurality of laser beams includes producing in a master laser oscillator a reference laser beam that is coherent and diffraction-limited, dividing the reference beam into a plurality of probe beams, and amplifying the divided beams in an equal plurality of laser amplifiers positioned to receive the respective probe beams;
      the method further includes reflecting each phase conjugated beam from its phase conjugation cell along a path substantially identical with that of the corresponding probe beam, and discriminating between a probe beam and the corresponding reflected beam, whereby the reflected beams emerging from the laser amplifiers are phase coherent with each other and are free of aberrations resulting from passage through the laser amplifiers and associated components.

5. A method as defined in claim 4, wherein the discrimination step includes:
   deflecting each probe beam and each reflected beam through an angle dependent on the direction of polarization; and
   polarizing the probe beams and the reflected beams in different directions;
   whereby the reflected beams emerge from the laser amplifiers along very slightly different paths from those along which the probe beams entered the amplifiers, and the reflected beams can therefore be deflected out of the apparatus as part of a composite output beam.

6. Apparatus for producing a phase conjugated laser beam, the apparatus comprising:
   a laser beam source for producing a coherent laser beam;
   a stimulated-Brillouin-scattering (SBS) phase conjugation cell;
   first optical means, for focusing the laser beam into the phase conjugation cell, to produce a phase conjugated laser beam from the cell;

a seed laser beam source;

second optical means, for focusing the seed laser beam into the phase conjugation cell in substantially the same direction as the phase conjugated laser beam, whereby properties of the seed laser beam can be used to control properties of the phase conjugated laser beam, wherein the second optical means includes means for controlling the phase of the seed laser beam relative to a reference phase.

7. Apparatus as defined in claim 6, wherein:

the seed laser beam source produces a beam of the same frequency as the phase conjugated beam expected from the phase conjugation cell.

8. Apparatus for producing a phase conjugated laser beam, the apparatus comprising:
- a laser beam source for producing a coherent laser beam;
- a stimulated-Brillouin-scattering (SBS) phase conjugation cell;
- first optical means, for focusing the laser beam into the phase conjugation cell, to produce a phase conjugated laser beam from the cell;
- a seed laser beam source; and
- second optical means, for focusing the seed laser beam into the phase conjugation cell in substantially the same direction as the phase conjugated laser beam, whereby properties of the seed laser beam can be used to control properties of the phase conjugated laser beam;
- wherein the laser beam source is operated at a power level below a threshold level conventionally required to ensure operation of the phase conjugation cell;
- and wherein the second optical means includes means for controlling the phase of the seed laser beam relative to a reference phase.

9. A method of controlling the properties of a phase conjugated beam, the method comprising the steps of:
- generating a laser beam;
- focusing the laser beam into a stimulated-Brillouin-scattering (SBS) phase conjugation cell;
- producing a phase conjugated laser beam from the cell;
- generating a seed laser beam;
- focusing the seed laser beam into the phase conjugation cell in substantially the same direction as the phase conjugated laser beam, whereby properties of the seed laser beam can be used to control properties of the phase conjugated laser beam; and
- controlling the phase of the seed laser beam relative to a reference phase, to produce a desired phase in the phase conjugated laser beam.

10. A method as defined in claim 9, wherein the step of generating the seed laser beam includes:

generating a beam of the same frequency as the phase conjugated laser beam expected from the phase conjugation cell.

11. A method of controlling the properties of a phase conjugated beam, the method comprising the steps of:
- generating a laser beam;
- focusing the laser beam into a stimulated-Brillouin-scattering (SBS) phase conjugation cell;
- producing a phase conjugated laser beam from the cell;
- generating a seed laser beam; and
- focusing the seed laser beam into the phase conjugation cell in substantially the same direction as the phase conjugated laser beam, whereby properties of the seed laser beam can be used to control properties of the phase conjugated laser beam;
- wherein the step of generating the laser beam is such that the power of the laser beam applied to the phase conjugation cell is below that which would be required to ensure phase conjugation operation of the cell if the seed beam were not present.

* * * * *